United States Patent [19]

Uchida et al.

[11] Patent Number: 5,466,453

[45] Date of Patent: Nov. 14, 1995

[54] METHOD FOR IMPROVING THE TASTE OF PINE EXTRACT, AND ORALLY ADMINISTRABLE PRODUCT OBTAINED THEREBY

[75] Inventors: Yukio Uchida; Satoshi Iritani; Toshio Miyake, all of Okayama, Japan

[73] Assignee: Kabushiki Kaisha Hayashibara Seibutsu Kagaku Kenkyujo, Okayama, Japan

[21] Appl. No.: 249,661

[22] Filed: May 26, 1994

Related U.S. Application Data

[63] Continuation of Ser. No. 42,110, Apr. 2, 1993, abandoned.

[30] Foreign Application Priority Data

Apr. 2, 1992 [JP] Japan .................................. 4-126605

[51] Int. Cl.$^6$ ..................................................... A61K 35/78
[52] U.S. Cl. ..................... 424/195.1; 514/783; 426/655; 424/196.1
[58] Field of Search ............................ 424/195.1, 196.1; 514/783, 880

[56] References Cited

U.S. PATENT DOCUMENTS

| | | | |
|---|---|---|---|
| 5,013,557 | 5/1991 | Tai | 424/493 |
| 5,026,833 | 6/1991 | Suzuki et al. | 536/18.1 |

FOREIGN PATENT DOCUMENTS

| | | |
|---|---|---|
| 0387042 | 9/1990 | European Pat. Off. . |
| 17-3821 | 2/1942 | Japan . |
| 41369 | 2/1979 | Japan . |
| 54-059311 | 5/1979 | Japan . |
| 61-289865 | 12/1986 | Japan . |
| 61-282059 | 12/1986 | Japan . |
| 62-172096 | 7/1987 | Japan . |
| 63-21060 | 1/1988 | Japan . |
| 1238532 | 9/1989 | Japan . |
| 1300880 | 12/1989 | Japan . |
| 358790 | 3/1991 | Japan . |
| 3115292 | 5/1991 | Japan . |
| 0573141 | 8/1993 | Japan . |
| 1734657 | 5/1992 | U.S.S.R. . |

OTHER PUBLICATIONS

Otani et al. *Int. J. Tissue React.*, 12(6), pp. 319–332, (1990). [Abstract Only].

Ariga; *Production of Healthy Drink Solution for Happy Event*, vol. 011, No. 141, 12 Dec. 1986.

Nakamoto; *Health Food Prepared From Extract of Plum Tree*, vol. 013, No. 575, 25 Sep. 1989.

Taniguchi; *Mochi (Rice Cake) Containing Pine, Bamboo and Ume (Plum) Mixed Therein*, vol. 013, No. 532, 31 Aug. 1989.

Alma–Ata Nonalc Ale; *Gasification Non–Alcoholic Drink*, Derwent Publications Ltd., 6 Mar., 1979.

Shin-yaku Kaihatsu no tameno Dobutsu Model Riyo Shusei, edited by Ryuta Ito, Ryo Takahashi and Nishio Honda, pp. 247–254 (1985), published by R&D Planing, Tokyo, Japan.

*Primary Examiner*—Douglas W. Robinson
*Assistant Examiner*—Howard C. Lee
*Attorney, Agent, or Firm*—Browdy and Neimark

[57] ABSTRACT

The disagreeable harsh, bitter, and astringent odor of pine extract is improved by incorporating into the pine extract a bamboo extract in the amount of from 0.1–20 times on a dry solid basis that of the pine extract, and an extract of Japanese apricot in an amount of 1–200 times on a dry solid basis that of the pine extract. The combination of the pine extract, bamboo extract and Japanese apricot extract is used as a health food or beverage, hair restorer, and medicine.

9 Claims, No Drawings

METHOD FOR IMPROVING THE TASTE OF PINE EXTRACT, AND ORALLY ADMINISTRABLE PRODUCT OBTAINED THEREBY

This application is a continuation-in-part, of application Ser. No. 08/042,110, filed Apr. 02, 1993, now abandoned.

BACKGROUND OF THE INVENTION

1. Field of the Invention

The present invention relates to a method for improving the taste of a pine extract, and to an orally administrable product obtained thereby.

2. Description of the prior art

Pine extracts, which contain essential oils, flavonoids, etc., have been prepared by extracting leaves, branches, seeds and cones of pines (plants of the family Pinaceae) such as akamatsu or Japanese red pine (*Pinus densiflora*), kuromatsu or Japanese black pine (*Pinus thunbergii*), goyomatsu (*Pinus pentaphylla*), shina-matsu (chinese pine) and chosen-matsu (*Pinus koraiensis*), with a solvent such as water or alcohols. These extracts have been used orally for a long time as a folk medicine.

The major pharmacological activities of the pine extracts are, for example, the improvement of the blood circulation for promoting the functions of organs such as heart, liver and kidney; the prevention of hypertension, infection and myocardial infarction; the promotion of the appetite and immune systems; the promotion of the relief of fatigue; and the promotion of recovery of health.

The pine extracts, however, have a disagreeable pungent odor of pitch which is harsh, bitter, and astringent, and these are the drawbacks of the extracts when administered orally.

Examples of methods of reducing the drawbacks are fermentation methods are disclosed in Japanese Patent Publication No. 3,821/67 and the Japanese Patent Laid-Open Nos. 41,369/79, 282,059/86, 289,865/86 and 300,880/89. The present inventors have consistently studied the fermentation methods and have found the following drawbacks:

(1) Although the fermentation methods improve part of the disagreeable of pitch, and the harshness, bitterness and astringency of a pine extract, the effects are not sufficient;

(2) The effective ingredients of a pine extract are degenerated, deteriorated and lost during steps in the fermentations, and these reduce the inherent activity and effect of the pine extract; and (3) In a purification step for a post-reaction mixture with a filter, the effective ingredients of a pine extract are adsorbed and removed by microorganisms, etc., to lower the yield.

Actually, the pine extracts have been used by consumers unwillingly after sweetened with only a sweetener, the extracts still retaining the disagreeable odor of pitch, which is harsh, bitter, and astringent.

There has been a great demand to establish an orally administrable product containing a pine extract which overcomes the above drawbacks, as well as having a satisfactory taste preference and an improved activity and effect of the pine extract.

SUMMARY OF THE INVENTION

The present invention was made to overcome the above drawbacks.

The present inventors studied to improve the taste of a pine extract and to establish an orally administrable product containing a pine extract having an improved activity and effect by incorporating into it one or more plant extracts which have been used as a folk medicine.

As a result, we unexpectedly found that the present object is attained by mixing a pine extract with specific ratios of a bamboo extract having per me a strong smell of straw, harshness, bitterness and astringency, and a Japanese apricot extract having per sea strong smell of burning, harshness, bitterness, astringency and sourness, and accomplished the present invention.

We found that an orally administrable product containing a pine extract, wherein a bamboo extract is incorporated in an amount of 0.1–20-fold that of the pine extract, on a dry solid basis (d.s.b.), and a Japanese apricot extract is incorporated in an amount of 1–200-fold that of the pine extract, d.s.b., satisfactorily improves the taste preference of the pine extract and augments the activity and effect, and accomplished the present invention.

Furthermore, we found that the combination use of a pine extract with a water-soluble α-glycosyl rutin in addition to the bamboo extract and Japanese apricot-extract further improves the quality of the present orally administrable product, as well as the activity and effect, and thus accomplished this invention.

DETAILED DESCRIPTION OF THE INVENTION

The present invention relates to a method for improving the taste of a pine extract, and to an orally administrable product obtained thereby.

The pine extracts usable in the present invention include those which are prepared by extracting leaves, branches, seeds, cones and barks of pines, as well as their tissue cultures. The method of extraction is not restricted, and conventional techniques can be suitably employed. Since pine extracts are conventional products, one skilled in the art can readily obtain these products without undue experimentation.

For example, a method using water or a readily water-soluble organic solvent such as ethanol as disclosed in Japanese Patent Laid-Open No. 21,060/88, and a method using an aqueous alkaline solution as disclosed in Japanese patent Laid-Open No. 238,532/89 are usually employed.

For example, conventional methods as disclosed in Japanese Patent Laid-Open Nos. 21,060/88 and No. 238,532/89 are suitably employed in the invention. The former discloses a method to prepare a pine extract comprising extracting pine leaves and trunks under heating conditions with water or an aqueous solution of a readily water-soluble organic solvent such as an alcohol or a ketone, and recovering the resultant extract. The latter discloses a method comprising disrupting shells of pine cones into pieces, extracting the resultant pieces with an aqueous alkaline solution of an organic base, inorganic base or ammonia, and recovering the resultant extract.

If necessary, a method as disclosed in Japanese Patent Laid-Open No. 172,096/88 can be used in the invention to prepare a pine extract, said method comprising extracting pine leaves, branches and trunks with a liquefied carbon dioxide in sub- or super-critical state a pressure of 60–300 $kg/cm^2$ and 25°–60° C., and recovering the resultant extract.

The pine extracts thus obtained are in the form of liquid, paste or powder, and their form can be adequately chosen to meet their final use. Commercially available pine extracts can be arbitrarily used.

The bamboo extracts usable in the invention are not specifically restricted as long as they contain the effective ingredients thereof and exhibit their inherent activities. Examples of such extracts are those which can be prepared by conventional methods comprising extracting leaves, branches and roots of bamboos including grass bamboos with a suitable solvent therefore, and recovering the resultant extracts, and those prepared by the aforesaid conventional methods employed in the preparation of pine extracts. Commercially available sasa extracts or extracts of bamboo grasses such as concentrated extracts of "kumazasa" (plants of the species *Sasa albo-marginata*), prepared by extracting "kumazasa" with hot water and concentrating the extracts, can be advantageously used.

The Japanese apricot extracts usable in the invention are not specifically restricted as long as they contain the effective ingredients thereof and exhibit their inherent activities. Examples of such extracts are those which can be prepared by conventional methods comprising extracting flesh of Japanese apricot with a suitable solvent, and recovering the resultant extracts, and those prepared by the aforesaid conventional methods employed in the preparation of pine extracts. Commercially available Japanese apricot extracts such as food products thereof can be advantageously used.

If necessary, a method as disclosed in Japanese Patent Laid-Open No. 172,096/88, wherein a liquefied carbondioxide in a supercritical state is used, can be employed.

The pine extracts thus obtained are in the form of liquid, paste or powder, and the form can be adequately chosen to meet the requirements of final use. Commercially available pine extracts can be advantageously used, if necessary.

The bamboo extracts usable in the present invention include those which are prepared by extracting leaves, branches and roots of bamboos including grass bamboos, and the method of extraction is not restricted and conventional techniques can be used similarly as in the case of pine extracts, Commercially available sasa extracts or extracts of bamboo grasses such as concentrated extracts of "kumazasa" (plants of the species *Sasa albo-marginata*) extracted with hot water can be advantageously used to meet to final use.

The Japanese apricot extracts usable in the present invention include those which are prepared by extracting a flesh of Japanese apricot. The method of extraction is not restricted, and conventional techniques can be advantageously used. Commercially available Japanese apricot extracts such as food products thereof can be advantageously used to meet to final use.

The α-glycosyl rutins usable in the invention mean a compound, wherein equimolar D-glucose residues attach in α-fashion to rutin, which has a satisfactory water-solubility and exerts the inherent activity of rutin when orally administered and hydrolyzed into rutin and D-glucose in vivo.

Examples of the preparation of such α-glycosyl rutins which can be used in the present invention are enzymatic reactions using saccharide-transferring enzymes as disclosed, for example, in Japanese Patent Laid-Open Nos. 58,790/91 and 115,292/91. If necessary, commercially available α-glycosyl rutin products can be advantageously used.

The usability of the α-glycosyl rutins as a hair restorer is disclosed in Japanese Patent Laid-Open No. 46,112/92.

Any orally administrable product containing a pine extract can be used in the invention as long as it can attain the present object, and the recommended form is, for example, in the form of a soft drink, granule and tablet which are readily usable for businessmen or other workers having a tight schedule.

The present orally administrable product contains prescribed amounts of a pine extract, bamboo extract and Japanese apricot extract together with or without a prescribed amount of an α-glycosyl rutin. The suitable amount of the pine extract is at least 0.01 w/w %, d.s.b., (the wording "w/w %, d.s.b." as referred to in the invention will be abbreviated as "%" hereinafter, unless specified otherwise), preferably, in the range of 0.02–5%. When the amount of a pine extract is lower than 0.01%, the inherent activity and effect of the pine extract would not be expected in view of its conventional oral administration amount, while the improvement of the taste preference of the pine extract attained by a bamboo extract and a Japanese apricot extract is insufficient when the amount of the pine extract exceeds 5%, d.s.b.

The amounts of a bamboo extract and a Japanese apricot extract with respect to that of a pine extract suitably used in the invention are respectively 0.1–20-fold and 1–200-fold, d.s.b., preferably, 0.5–10-fold and 5–100-fold, d.s.b. These amounts suitably improve the taste of the pine extract, as well as augment the activity and effects thereof.

The amount of an α-glycosyl rutin with respect to that of a pine extract is in the range of 0.1–10-fold, d.s.b., which preferably augments the activity, effect and storage stability of the present orally administrable product, as well as the hair-growth promoting activity.

When a pine extract is mixed with a bamboo extract and a Japanese apricot extract in the above-mentioned specific ratios, the resultant product usually shows a pH in the range of about 2–4.5, and in case the product is off the pH range it is preferably adjusted to a pH within the pH range by the addition of an adequate pH-controlling agent in view of the taste preference.

The wording "pH" as referred to in the invention means a pH value measured by a pH meter as follows: (i) An orally administrable product in the form an aqueous solution is subjected to the measurement with the pH meter; and (ii) an orally administrable product in the form of solid is first prepared into an about 10% aqueous solution, then subjected to the measurement.

In addition to the above-mentioned ingredients, the present orally administrable product containing a pine extract can have advantageously added thereto one or more other adequate additives, for example, a flavor-imparting agent, color-imparting agent, acid-imparting agent, sweetener, vitamin, mineral, animal or plant-extract, biologically active substance, filler and excipient in order to improve further the taste of the product and to augment the maintenance and promotion of health, and the prevention and treatment of diseases, as well as the promotion of recovery of health from diseases.

The methods for incorporating the other additives in the present orally administrable product containing a pine extract usable in the invention may be conventional techniques such as mixing, kneading, dissolving, soaking, spraying and injecting.

Compared with conventional products of pine extracts, the present orally administrable product containing a pine extract thus obtained has an improved taste, as well as the inherent pharmacological activity of pine extracts as mentioned above, and is synergistically imparted the inherent activity of a bamboo extract such as an antiseptic activity, activity to remove a foul breath, antiphlogistic activity, hypotensive activity, sedative activity, antitumor activity and immuno-activating activity, as well as the inherent activity of a Japanese apricot extract such as an activity to control intestinal disorder, activity to promote appetite, activity to relive or remove fatigue, activity of hemocatharsis, and activity to improve physical constitution. Thus, the present orally administrable product is advantageously used as a hair restorer, agent for anti-susceptive diseases, and health food or beverage.

The wording "agent for anti-susceptive diseases" as referred to in the invention means diseases which can be treated and prevented by the present orally administrable product containing a pine extract. Examples of such diseases or susceptive diseases are infectious diseases caused by viruses and microorganisms; circulatory diseases such as hypertension and myocardial infarction; nervous diseases such as stress syndrome; immunopathies; and malignant tumors, The dose is adequately controlled depending on the administration frequency and the content of a pine extract in the present orally administrable product. Usually, a dose in the range of about 0.001–10 g/day/adult of a pine extract, d.s.b., is recommended.

The present orally administrable product containing a pine extract well harmonizes with substances having salty, astringent and satisfactory taste, and has a strong bacteriostatic activity and antioxidant activity, and because of these the product is not restricted to a specific field such as health foods and beverages, as well as agents for anti-susceptive diseases. The product is advantageously used in a variety of food products in general to improve their taste, shelf-life and qualitative stability: Examples of such food products are seasonings such as soy sauce, "furikake", mayonnaise, dressing, "sanbai-zu", "chuka-no-moto", "tentsuyu" (soup for tenpura), "mentsuyu" (soup for Japanese-style noodles), worcester sauce, ketchup, "yakiniku-no-tare" (soup for grilled meat), curry roux, stew premix, soup premix, "dashi-no-moto", mixed seasoning, "shin-mirin" (synthetic mirin), table sugar and coffee sugar; Japanese-style confectioneries such as "okoshi" (millet-and rice cracker), "karinto (fried dough cookie), "gyuhi" (starch paste), rice paste, "manju" (bun with a bean-Jam filling), "uiro" (sweet rice jelly), "an" (bean jam), "yokan" (sweet jelly of beans), "mizu-yokan" (soft adzuki-bean jelly), "kingyoku", jelly, castella and "amedama" (Japanese-style toffee); Western-style confectioneries such as bun, cookie, pie, pudding, cream puff, waffle, sponge cake, doughnut, chocolate, chewing gum, caramel and candy; ice cream and sherbet; syrups such as those for fruit preserve and "kaki-gori" (shaved ice); pickled products such as "fukujin-zuke" (sliced vegetables picked in soy sauce), "senmai-zuke" and "rakkyo-zuke" (pickled shallots); meat products such as ham and sausage; fish meat products such as fish meat ham, fish meant sausage, "kamaboko" (boiled fish paste), "chikuwa" (literally bamboo wheels) and "hanpen"; relishes such as "uni-no-shiokara" (salted guts of sea urchin), "ika-no-shiokara" (salted guts of squid), "su-konbu", "saki-surume" and "fugu-no-mirinboshi"; alcoholic drinks such as synthetic sake, "zojo-shu", liquor, wine and whisky; and beverages such as coffee, cocoa, Juice, carbonated beverage, lactic acid beverage and lactobacillus beverage.

The orally administrable product can be advantageously used in feeds and pet foods for domestic animals, poultry, bees, silkworms and fishes including pet fishes as an antiseptic and agent to control intestinal disorder, as well as an agent to relieve or remove stress.

The orally administrable product can be advantageously used as an oral product such as a tobacco, troths, sublingual agent, cachou, oral refrigerant, gargle, dentifrice and chewing gum, as well as other cosmetics.

The following experiments will explain the present invention in detail.

EXPERIMENT 1

Influence of Plant Extract on Taste of Pine Extract

In order to improve the disagreeable smell and taste of a pine extract, the pine extract was mixed with plant extracts known as a folk medicine, and the taste of the resultant mixture was evaluated by a panel test.

The pine extract was in usual manner prepared from a pine leaf to give a concentration of 0.1 w/v %. Other plant extracts were prepared from commercially available ones or prepared in usual manner and adjusted to give a concentration of 1.0 w/v %. Equal volumes of the pine extract and one of other plant extracts were mixed. As a control, a fresh preparation of the same pine extract was mixed with the same volume of water. Sugar as a sweetener was dissolved in each mixture to give a concentration of 5 w/v %.

Accordingly, the samples used in the panel test had a fundamental composition of 0.05 w/v % of a pine extract, 0.5 w/v % of a plant extract and 5 w/v % of sugar. The panel members were 16 (10 males and 6 females), and the panel test was carried out at 24° C.

The results were as shown in Table 1.

TABLE 1

| Test No. | | Evaluation | | |
|---|---|---|---|---|
| | | Point 0 | Point 1 | Point 2 |
| 1 | Pine extract | 16 | 0 | 0 |
| 2 | Pine extract + sugar | 15 | 1 | 0 |
| 3 | Pine extract + sugar + loquat (*Eriobottya japonica*) leaf extract | 11 | 5 | 0 |
| 4 | Pine extract + sugar + dokudami (*Houttuyia cordata*) extract | 13 | 3 | 0 |
| 5 | Pine extract + sugar + ginkgo (*Ginkgo biloba*) extract | 13 | 3 | 0 |
| 6 | Pine extract + persimmon (Diospyros) leaf extract | 12 | 4 | 0 |
| 7 | Pine extract + sugar + chlorella extract | 15 | 1 | 0 |
| 8 | Pine extract + sugar + bamboo extract | 4 | 12 | 0 |
| 9 | Pine extract + sugar + field horsetail extract | 14 | 2 | 0 |
| 10 | Pine extract + sugar + Japanese apricot extract | 3 | 13 | 0 |

In the evaluation of table 1, "point 0" means the number of panel members who answered that the smell and taste of a sample were too unsatisfactory or strong and not readily orally taken; "point 1", the number of panel members who answered that a sample could be orally taken in spite of the unsatisfactory smell and taste; and "point 2", the number of panel members who answered that a sample had a satisfactory taste preference and was readily orally taken.

As evident from the results in table 1, it was found that the combination use of the pine extract with one of plant extracts revealed that the bamboo extract and the Japanese apricot extract showed a relatively-high level of activity to improve the taste preference of the pine extract.

EXPERIMENT 2

Influence of Bamboo Extract and Japanese Apricot Extract on Taste Preference of Pine Extract A bamboo extract and a Japanese apricot extract were incorporated in a pine extract, and the taste preference of the resultant mixture was evaluated by a panel test. Samples used in the panel test were prepared by first providing a group consisting of 0.05 w/v % of a pine extract and 5 w/v % of sugar and another group consisting of 0.2 w/v % of a pine extract and 10 w/v % of sugar, then adding to the groups 0.1–20-fold volumes of a bamboo extract and 1–200-fold volumes of a Japanese apricot extract against the weight of the pine extract, d.s.b.

As a control, a sample containing a pine extract but free of a bamboo extract and a Japanese apricot extract was prepared.

The samples were subjected to the panel test similarly as in Experiment 1.

The results were as shown in Table 2.

TABLE 2

| Test No. | Magnification against pine extract, d.s.b. | | Evaluation Point 0 | Point 1 | Point 2 |
|---|---|---|---|---|---|
| 1 | A | Bamboo extract | 0 | 15 | 1 | 0 |
|   |   | Japanese apricot extract | 0 | | | |
| 2 | A | Bamboo extract | 0.1 | 0 | 8 | 8 |
|   |   | Japanese apricot extract | 1 | | | |
| 3 | A | Bamboo extract | 0.5 | 0 | 2 | 14 |
|   |   | Japanese apricot extract | 5 | | | |
| 4 | A | Bamboo extract | 3 | 0 | 0 | 16 |
|   |   | Japanese apricot extract | 30 | | | |
| 5 | A | Bamboo extract | 10 | 0 | 3 | 13 |
|   |   | Japanese apricot extract | 100 | | | |
| 6 | A | Bamboo extract | 20 | 0 | 10 | 6 |
|   |   | Japanese apricot extract | 200 | | | |
| 7 | B | Bamboo extract | 0 | 16 | 0 | 0 |
|   |   | Japanese apricot extract | 0 | | | |
| 8 | B | Bamboo extract | 0.1 | 0 | 10 | 6 |
|   |   | Japanese apricot extract | 1 | | | |
| 9 | B | Bamboo extract | 0.5 | 0 | 3 | 13 |
|   |   | Japanese apricot extract | 5 | | | |
| 10 | B | Bamboo extract | 3 | 0 | 1 | 15 |
|   |   | Japanese apricot extract | 30 | | | |
| 11 | B | Bamboo extract | 10 | 0 | 2 | 14 |
|   |   | Japanese apricot extract | 100 | | | |
| 12 | B | Bamboo extract | 20 | 0 | 6 | 10 |
|   |   | Japanese apricot extract | 200 | | | |

Note: The symbol "A" means 0.05 w/v % of a pine extract and 5 w/v % of sugar, and the symbol "b" means 0.2 w/v % of a pine extract and 10 w/v % of sugar.

The criterion of the evaluation was the same as in the case of Table 1.

As evident from the results in Table 2, it was revealed that the taste of the pine extract was improved by a large margin when used in combination with the bamboo extract and the Japanese apricot extract. The effect is exerted in both cases of "A" and "B" wherein the bamboo extract and the Japanese apricot extract were incorporated in the pine extract in respective amount of about 0.1–20-fold and about 1–200-fold that of the pine extract, d.s.b., and, more particularly, it is extremely-highly exerted in respective amount of 0.5–10-fold and 5–100-fold that of the pine extract, d.s.b.

"α-G Rutin", an α-glycosyl rutin product commercialized by Toyo Sugar Refining Co., Ltd., Tokyo, Japan was incorporated in the above samples in an amount of 0.1–5-fold that of the pine extract, d.s.b, and the resultant mixtures were subjected to a panel test to obtain the same results as in Table 2. The results revealed that the α-glycosyl rutin dose not affect the taste preference of a pine extract.

EXPERIMENT 3

Virus-inhibitory Effect

The virus-inhibitory effect of a sample was studied with the plaque-reduction assay referred to as a plaque-depressing-dose- 50% ($PDD_{50}$) wherein FL cells were infected with vesicular stomatitis virus (VSV) or herpes simplex virus type 1 (HSV-1 virus) which had been treated with a solution containing a pine extract.

A sample, which was equal to the sample No. 9 in Table 2, containing 0.2 w/v % of a pine extract, 10 w/v % of sugar, 0.5 w/v % of a bamboo extract and 5 w/v % of a Japanese apricot extract was prepared by the method in Experiment 2 (referred to as "sample A" hereinafter), and another sample was prepared by incorporating an equal amount of an α-glycosyl rutin in sample A, d.s.b., (referred to as "sample B" hereinafter). In addition, a sample, which was equal to the sample No. 7 in Table 2, was prepared as a pine extract (referred to as "sample C" hereinafter).

The samples were diluted with Hanks' solution (pH 7.4) to give a concentration of 10 or 50 µg/ml of a pine extract. A solution used as a virus solution was adjusted to give a concentration of about $10^2$–$10^4$ plaque-forming units per ml was used.

FL cells were infected with virus in a solution which had been prepared by mixing 0.5 ml of one of the above-mentioned pine extract and 0.5 ml of the virus solution, and incubated at 37° C. for one hour to form plaques, followed by counting the plaques.

As a control, a virus solution free of a pine extract was prepared, and, similarly as above FL cells were infected with virus in the virus solution to form plaques, followed by counting the plaques. The virus-inhibitory effect (%) was calculated by the following formula:

$$\text{Virus-inhibitory effect (\%)} = \frac{X - Y}{X} \times 100$$

Note: The symbol "X" means the number of formed plaques as in control; and the symbol "Y", the number of formed plaques treated with the pine extract.

The relationship between the concentrations (µg/ml) of samples A, B and C and the virus-inhibitory effects (%) of the samples was tabulated in Table 3.

TABLE 3

| Virus | Sample | Concentration of pine extract (µg/ml) | | |
|---|---|---|---|---|
| | | 0 | 10 | 50 |
| VSV | A | 0 | 26.4 | 54.1 |
| | B | 0 | 30.2 | 60.3 |
| | C | 0 | 10.2 | 22.6 |
| HSV-1 | A | 0 | 100 | 100 |
| | B | 0 | 100 | 100 |
| | C | 0 | 86.9 | 100 |

As evident from the results in Table 3, the pine extract (sample C) per se showed a virus-inhibitory effect, and the level of which was augmented by the combination use of the bamboo extract and Japanese apricot extract (sample A).

It was revealed that the effect was more augmented when further used in combination -with the α-glycosyl rutin (sample B).

EXPERIMENT 4

Inhibitory Effect on Gastric Ulcer

EXPERIMENT 4-1

Inhibitory Effect on Gastric Ulcer Induced by Inducing Stress on Rat

In accordance with the method described by Matsuo et el. in *Shin-yaku Kaihatsu no tameno Dobutsu Model Riyo Shusei*, edited by Ryuta Ito, Ryo Takahashi and Nishio Honda, pp. 247–254 (1985), published by R & D Planing, Tokyo, Japan, male rats of Wister strain, 280–350g each, were restricted in a stress cage made of wire nets, and the whole body except for the head of each rat was soaked in 23° C. water for 18 hours to induce an acute gastric ulcer.

EXPERIMENT 4-2

Oral Administration of Inhibitory Agent for Gastric Ulcer Induced by Stress

Samples A, B and C prepared by the method in Experiment 3 as an inhibitory agent for gastric ulcer induced by stress were diluted to give a concentration of about 0.3 w/v %, and administered to rats. As a control, distilled water or an aqueous solution in which sugar had been dissolved to give a prescribed concentration, and administered to rats. The administration method was as follows: Eight rats were grouped into one and orally administered compulsorily with a 3 ml/rat solution of an inhibitory agent for gastric ulcer induced by stress with a sound for stomach 10 minutes before the initiation of the load of a stress on rats.

After completion of the load, the rats were allowed to inhale ether to die and anatomized to measure the length (mm) of each erosion formed on the surface of stomach mucosa, followed by summing up the measured lengths to give the ulcer index of each rat.

The results were tabulated in Table 4.

TABLE 4

| Group | Stress-inhibitory agent | Dose (mg/3 ml/rat) | Ulcer index (mm) |
|---|---|---|---|
| I | Distilled water | 0 | 65 |
| II | Sugar | 9 | 57 |
| III | Sample A | 9 | 26 |
| IV | Sample B | 9 | 24 |
| V | Sample C | 9 | 35 |

As evident from the results in Table 4, the group V which had been administered with the sample C showed an ulcer-index of 35 mm which was reduced to about 54% as compared with the group I (administered with distilled water) having an ulcer index of 65 mm as a control, while the group III with the sample A containing a pine extract and a Japanese apricot extract showed an ulcer-index of 26 mm which was reduced to about 40%, and the group IV with the sample B showed an ulcer-index of 24 mm which was reduced to about 37%.

The results revealed that a pine extract has an inhibitory effect on gastric ulcer induced by stress and the effect is augmented by the combination use of a bamboo extract and a Japanese apricot extract, and more augmented when additionally used in combination with an α-glycosyl rutin in addition to the extracts. In other words, the pine extract composition of the present invention can be used for treating gastric ulcers by administering the pine extract composition in an amount ranging from about 0.00/to about 10 gram/day/adult, the pine extract measured on a dry solid basis.

EXPERIMENT 5

Macrophage-activating Effect

Samples A, B and C prepared by the method in Experiment 3 were respectively diluted by 100-fold with RPMI 1640 medium plus 10 v/v % bovine serum buffered with 10 mM Hepes to give pH 7.4, and the resultant solutions were used as a macrophage-activating agent.

Macrophage-activating effect was assayed in the usual manner: Macrophages were recovered from a peritoneal of BALB/c mouse, transferred to a 96-well plastic microtiter tray, allowed to adhere to the walls, added with 0.1 ml/well of the macrophage-activating agent, and incubated at 37° C. under a 5% $CO_2$ atmospheric condition. Five hours after the initiation of the incubation, the plate was photographed, and the percentage of the number of activated and extended macrophages as compared to that of the total macrophages was calculated to give a percentage (%) of the activated macrophages. The effect of each macrophage-activating agent was evaluated based on the level of the percentage. As a control, distilled water was substituted for the macropharge-activating agents.

The results were as shown in Table 5.

TABLE 5

| Macrophage-activating agent | Percentage (%) of activated macrophages | Judgement |
|---|---|---|
| Distilled water | 2 | Control |
| Sample A (Pine-, bamboo- plus Japanese apricot-extracts) | 30 | Present invention |
| Sample B (Pine-, bamboo- and Japanese apricot-extracts plus rutin) | 35 | Present invention |
| Sample C (Pine extract) | 11 | Control |

As evident from the results in Table 5, it was found that the pine extract (sample C) per se exhibited a macrophage-activating activity, and the activity was augmented by the combination use of the bamboo and Japanese apricot extracts (sample A) and more augmented by the combination use of the α-glycosyl rutin in addition to the above two extracts (sample C).

EXPERIMENT 6

Acute Toxicity Test

Lyophilized sample A or B prepared by the method in Experiment 3 was tested for the acute toxicity by administering the sample to 7-week-old rid-strain mice. No mouse died up to the dose of 0.5 g/rat, and a higher dose test was impossible. The results showed that the acute toxicities of the samples were extremely low.

The preferred examples of the present invention will be described hereinafter.

EXAMPLE 1

Beverage

In accordance with the following composition, the ingredients were dissolved in water, and the resultant undissolved substances were removed. The solution thus obtained was membrane filtered, aseptically injected into a 100-ml bottle, and cap sealed to obtain a beverage containing a pine extract.

| Composition | Percentage (%), d.s.b. |
| --- | --- |
| Pine extract | 0.05 |
| Bamboo extract | 0.3 |
| Japanese apricot extract | 3.0 |
| Isomerized sugar | 10.0 |
| Water | |

The product is a pine extract beverage having a satisfactory taste, and advantageously used in the maintenance and promotion of health, and the prevention and treatment of diseases, as well as the recovery of health from diseases.

The product can be advantageously used in a variety of food products in order to attain the improvements of their taste, shelf-life and stabilization of quality.

EXAMPLE 2

Beverage

Similarly as in Example 1, a pine extract beverage consisting of the following Composition was prepared.

| Composition | Percentage (%), d.s.b. |
| --- | --- |
| Pine extract | 0.1 |
| Bamboo extract | 0.5 |
| Japanese apricot extract | 2.0 |
| Citric acid | 0.5 |
| L-Ascorbic acid | 0.5 |
| Hydrolyzed starch syrup | 20.0 |
| α-Glycosyl rutin | 0.1 |
| Water | |

The product is a pine extract beverage having a satisfactory taste, and, similarly as the product in Example 1 is advantageously used as a hair restorer, as well as in the maintenance and promotion of health, the prevention and treatment of diseases, and the recovery of health from diseases.

The product can be advantageously used in a variety of food products in order to attain the improvements of their taste, shelf-life and stabilization of quality.

EXAMPLE 3

Pulverized Product

One part by weight of a pasty pine extract was kneaded with 3 parts by weight of a pasty bamboo extract and 7 parts by weight of a pasty Japanese apricot extract, and the mixture was admired with 20 parts by weight of an anhydrous crystalline maltose and 40 parts by weight of a powder prepared by pulverizing a hydrolyzed starch syrup containing a cyclodextrin. The resultant mixture was ventilated with 40° C. air for one hour to effect drying, and mixed with 20 parts by weight of an anhydrous crystalline maltose to homogeneity, and one g aliquots of the resultant mixture were injected to laminated aluminum bags and sealed.

The product has a satisfactory water-solubility and taste, and because of these it can be orally administered directly as a health food, antiviral agent and antistress agent, as well as an ingredient for other orally administrable products such as beverages confectionaries, seasonings, orally usable products and internal medicines, and used in the maintenance and promotion of health, the prevention and treatment of diseases, and the promotion of recovery of health from diseases.

EXAMPLE 4

Tablet

One part by weight of L-ascorbic acid was mixed homogeneity with 10 parts by weight of an orally administrable product in the form of powder containing a pine extract prepared by the method in Example 3, 2.5 parts by weight of corn starch, 7.5 parts by weight of an anhydrous crystalline maltose powder, and 0.5 parts by weight of an α-glycosyl rutin, and the resultant mixture was tabletted with a tablet machine having a diameter of 12 mm and a 20R punch to obtain the captioned product.

The product, a tablet having a satisfactory taste, exerts the inherent effects of a pine extract, bamboo extract and Japanese apricot extract, as well as the effect of a complexed vitamin of an α-glycosyl rutin and L-ascorbic acid.

The product can be advantageously used as a hair restorer, as well as in the maintenance and promotion of health, the prevention and treatment of diseases, and the promotion of recovery of health from diseases.

EXAMPLE 5

Chewing Gum

Three parts by weight of a gum base was melted by heating to be softened, added with 7 parts by weight of an orally administrable product in the form of powder containing a pine extract prepared by the method in Example 3, and 0.1 part by weight of a ginseng extract, and the mixture was mixed with 0.1 part by weight of a stevia sweetener and adequate amounts of a coloring agent and flavoring agent. The resultant mixture was in usual manner kneaded with a roll, formed and packed to obtain the captioned product.

The product, a chewing gum having a satisfiable texture and taste, does not substantially induce dental caries.

The product can be advantageously used in the maintenance and promotion of health and the prevention and treatment of diseases, as well as the promotion of recovery of health from diseases.

EXAMPLE 6

Gummy Candy

Ninety parts by weight of "MABIT®", a hydrogenated maltose granule commercialized by Hayashibara Shoji, Inc., Okayama, Japan, was mixed by heating to homogeneity with 60 parts by weight of an orally administrable product containing a pine extract prepared by the method in Example 3, and the mixture was added with a solution in which 13 parts by weight of gelatin had been dissolved in 18 parts weight of water, and adequate amounts of a coloring agent and flavoring agent. The resultant mixture was formed and packed to obtain the captioned product.

The product is a gummy candy having a satisfiable texture and taste.

The product can be advantageously used in the maintenance and promotion of health and the prevention and treatment of diseases, as well as the promotion of recovery of health from diseases.

EXAMPLE 7

Butter Cake

Fifty parts by weight of butter free of salt, 50 parts by weight of shortening, 50 parts by weight of honey, and 130 parts by weight of sugar were mixed to homogeneity, and the mixture was admixed with 150 parts by weight of egg. The resultant mixture was admixed with 135 parts by weight of pulverized wheat, 75 parts by weight of milk, 4 parts by weight of sodium bicarbonate and an adequate amount of vanilla. The mixture thus obtained was in usual manner poured into a mold, baked up and cooled to an ambient temperature. The baked product was painted by using a brush with a syrup prepared by mixing 80 parts by weight of a beverage obtained by the method in Example 1, 20 parts by weight of a Japanese apricot liquor, and 20 parts by weight of cognac to obtain the captioned product.

The product lea butter cake having a satisfactory taste. The product can be advantageously used in the maintenance and promotion of health, and the prevention and treatment of diseases, as well as the promotion of recovery of health.

EXAMPLE 8

Ice Cream

To 2,000 parts by weight of milk was added at about 60° C. to 200 parts by weight of egg yolk, 50 parts by weight of egg, 420 parts by weight of fructose, 30 parts by weight of hydrogenated starch syrup, 200 parts by weight of raw cream, 20 parts by weight of condensed milk free of sugar, 300 parts by weight of a beverage prepared by the method in Example 2, and one part by weight of gelatin powder, and the resultant mixture was sterilized at 75° C. for 15 minutes, cooled while adding thereto 20 parts by weight of a Japanese apricot liquor, transferred to a container, and frozen to obtain the captioned product.

The product was an ice cream having a rich and satisfactory taste. The product can be advantageously used in the maintenance and promotion of health, the prevention and treatment of diseases, and the promotion of recovery of health.

As described above, the present invention diminishes conventional drawbacks of a pine extract such as the disagreeable stimulating-smell of pitch, the harshness, bitterness and astringency of the pine extract by incorporating in the pine extract specific ratios of a bamboo extract and a Japanese apricot extract as an effective crude drug, and improves the taste preference of the pine extract, as well as augmenting the activity and effect of the pine extract by a large margin. Accordingly, the present orally administrable product containing These extracts is advantageously used as a health food or beverage, hair restorer and agent for anti-susceptive diseases.

While there has been described what is at present considered to be the preferred embodiments of the invention, it will be understood the various modifications may be made therein, and it is intended to cover in the appended claims all such modifications as fall within the true spirits and scope of the invention.

We claim:

1. A method for improving the taste of a pine extract, comprising adding to 0.01–5 w/w % of a pine extract a bamboo extract in an amount of 0.1–20-fold that of said pine extract and a Japanese apricot extract in an amount of 1–200-fold that of said pine extract wherein the amounts of said pine extract, bamboo extract and Japanese apricot extract are based on their dry solids weight.

2. An orally administrable product having an acceptable taste, which contains about 0.01–5 w/w % of a pine extract, a bamboo extract in an amount of 0.1–20-fold that of said pine extract, and a Japanese apricot extract in an amount of 1–200-fold that of said pine extract wherein the amounts of said pine extract, bamboo extract and Japanese apricot extract are based on their dry solids, and an orally acceptable carrier therefor.

3. The orally administrable product of claim 2, which additionally contains an α-glycosyl rutin in an amount of 0.1–10-fold that of said pine extract, based on the dry solids.

4. The product of claim 2, wherein the orally acceptable carrier is a member selected from the group consisting of health foods, health beverages, and oral products.

5. The product of claim 2, wherein the pH of the product is in the range of about 2–4.5.

6. A method for treating gastric ulcer comprising administering to a patient in need thereof an effective amount of the composition according to claim 2 to treat said gastric ulcer.

7. A method for treating gastric ulcer comprising administering to a patient in need thereof an effective amount of the composition according to claim 3 to treat said gastric ulcer.

8. The method according to claim 6 wherein said composition is administered to a patient in need thereof in the range of about 0.001 to 10 gram/day/adult of said pine extract, said pine extract being measured based on the dry solids.

9. The method according to claim 7 wherein said composition is administered to a patient in need thereof in the range of about 0.001 to 10 gram/day/adult of said pine extract, said pine extract being measured based on the dry solids.

* * * * *